United States Patent [19]
Burgoon

[11] 3,973,096
[45] Aug. 3, 1976

[54] ADJUSTABLE CIRCUIT-INTERRUPTER WITH IMPROVED SUPPORT MEANS

[75] Inventor: Richard J. Burgoon, Murrysville, Pa.

[73] Assignee: Westinghouse Electric Corporation, Pittsburgh, Pa.

[22] Filed: Nov. 8, 1974

[21] Appl. No.: 522,192

Related U.S. Application Data

[63] Continuation of Ser. No. 344,014, March 22, 1973, abandoned.

[52] U.S. Cl. .................. 200/144 B; 200/50 AA; 200/289; 317/100
[51] Int. Cl.² .................. H01H 33/00; H01H 1/62; H01H 9/52; H02B 1/00
[58] Field of Search ............ 200/50 A, 50 AA, 304, 200/306, 289, 48 R, 48 KB, 144 B; 317/100, 103, 112; 174/138 R

[56] References Cited
UNITED STATES PATENTS

| | | | |
|---|---|---|---|
| 3,167,629 | 1/1965 | Cobine | 200/304 X |
| 3,274,356 | 9/1966 | Godfrey | 200/50 AA X |
| 3,356,902 | 12/1967 | Blaikie | 317/100 |
| 3,783,208 | 1/1974 | Davies et al. | 200/50 AA |
| 3,793,494 | 2/1974 | Cleaveland | 200/50 AA |

Primary Examiner—James R. Scott
Attorney, Agent, or Firm—W. R. Crout

[57] ABSTRACT

An improved adjustable circuit-interrupter is provided capable of withstanding the forces of high momentary currents, while utilizing easily-made parts, many of which are common for different-rating breakers. The circuit-interrupter arrangement provides more rigidity than prior-art interrupter arrangements, and is capable of withstanding the tremendous lateral forces encountered and associated with high momentary currents passing through the interrupter. The arrangement represents a substantial cost reduction, when compared with the solid-insulation-type of pole-unit interrupter currently in production. A support-rod provides a means of adjustment of the height of the primary disconnecting contact fingers of the device, and eliminates the necessity of many critical dimensions on the pole-unit without compromising the ability of the roll-in-type circuit-interrupter to "plug" into a standard cubicle, or cell.

An additional upper support-rod may be provided to provide an additional means of adjustment for the height of the upper primary disconnecting contact finger assembly, and additionally provides a positive clamp for a vacuum-type circuit-interrupting element, when the latter is selected as the desired interrupting means.

16 Claims, 6 Drawing Figures

ADJUSTABLE CIRCUIT-INTERRUPTER WITH IMPROVED SUPPORT MEANS

This is a continuation of application Ser. No. 344,014 filed Mar. 22, 1973, now abandoned.

CROSS-REFERENCE TO RELATED APPLICATIONS

Reference may be made to U.S. patent application filed Nov. 21, 1972, Ser. No. 308,370 now abandoned, by Charles M. Cleaveland, entitled, "Improved Air-Type Circuit Interrupters Using Rectangular Bars For Conductor-Assemblies", and assigned to the assignee of the instant application.

Also, reference may be made to a second patent application filed Mar. 18, 1975, Ser. No. 559,464 by Charles M. Cleaveland, and likewise assigned to the assignee of the instant application.

BACKGROUND OF THE INVENTION

The present invention has particular applicability to vacuum-type circuit interrupters which are utilized in metal-clad switchgear constructions, such as set forth in the following U.S. Pat. Nos. 3,590,188 — Frink et al; 3,531,608 — Bateman; and 3,435,162 — Kozlovic.

It is desirable to provide an adjustment means to readily adjust and secure the movable primary disconnecting contacts associated with roll-in-type switchgear units. The latter roll into cell structures, such as set forth in FIGS. 35 and 37 in U.S. Pat. No. 3,590,188, and it is consequently desirable to provide a proper and accurate alignment means between the movable disconnecting contacts and the relatively stationary disconnecting contacts, the latter being associated and mounted within the cooperating cell structure.

SUMMARY OF THE INVENTION

In accordance with the present invention, there is provided an improved adjustable means for adjustably locating the position of the movable primary disconnecting contacts associated with roll-in-type switchgear. An upper support rod is utilized, in conjunction with upper standoff insulators, to provide adjustment for the upper movable primary disconnecting contacts, and moreover provide a positive clamp for the vacuum-interrupter element, when the latter is utilized. In addition, a lower support rod is provided for adjustable support of the lower conductor assembly, and also provides a ready means of adjustment of the height of the lower movable primary disconnecting contact fingers.

The ability to adjust the height of each, or both of the movable primary disconnecting contacts eliminates the necessity of many critical dimensions otherwise required on roll-in pole-unit interrupters without compromising the ability of the breaker to "plug" into a standard cubicle or cell.

DESCRIPTION OF THE PREFERRED EMBODIMENT

Figure 1:
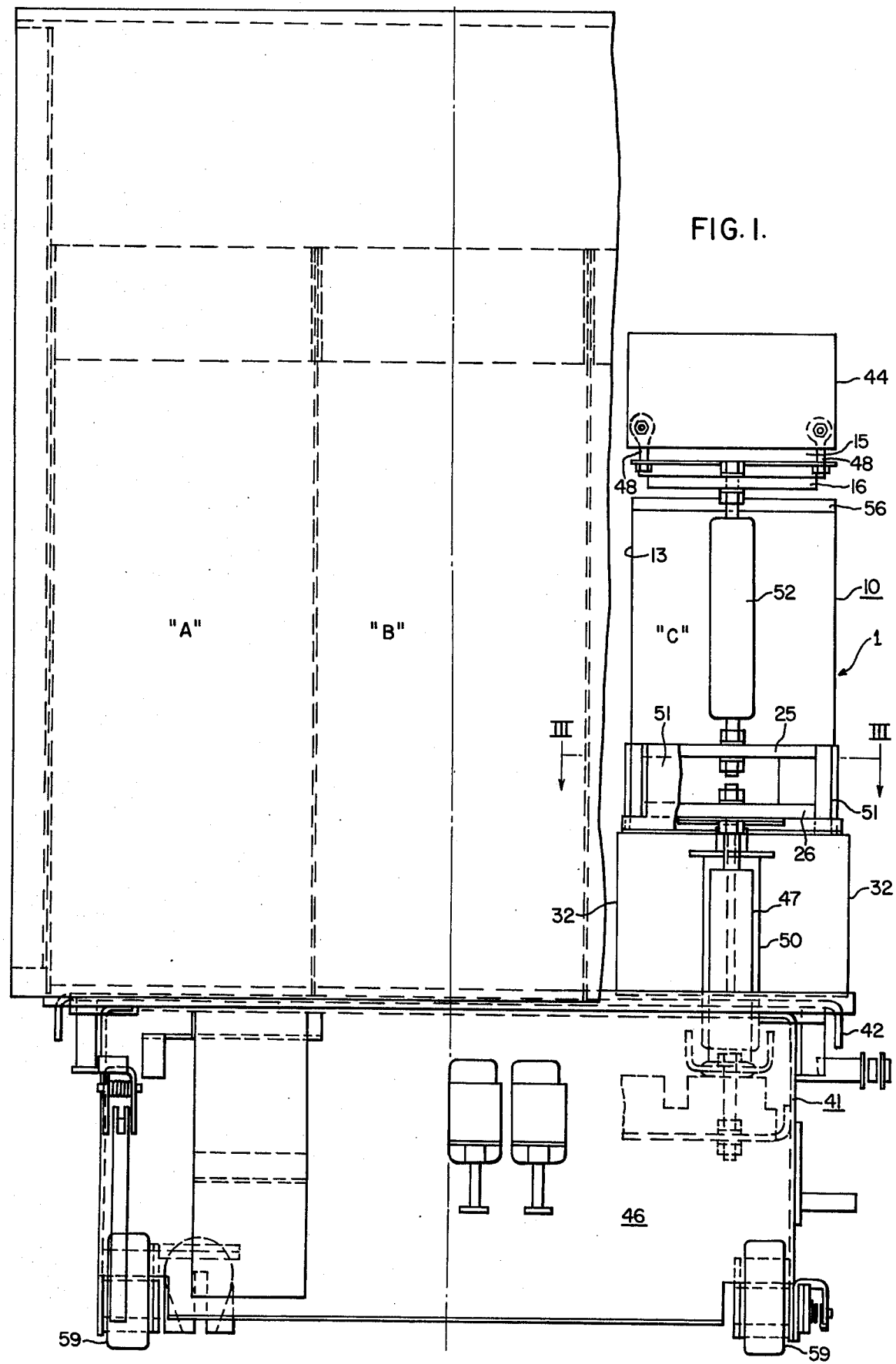
FIG. 1 is a front elevational view, partially in section, of a three-phase circuit-interrupter incorporating the principles of the present invention, the contact structure being illustrated in the closed-circuit position.
Figure 2:
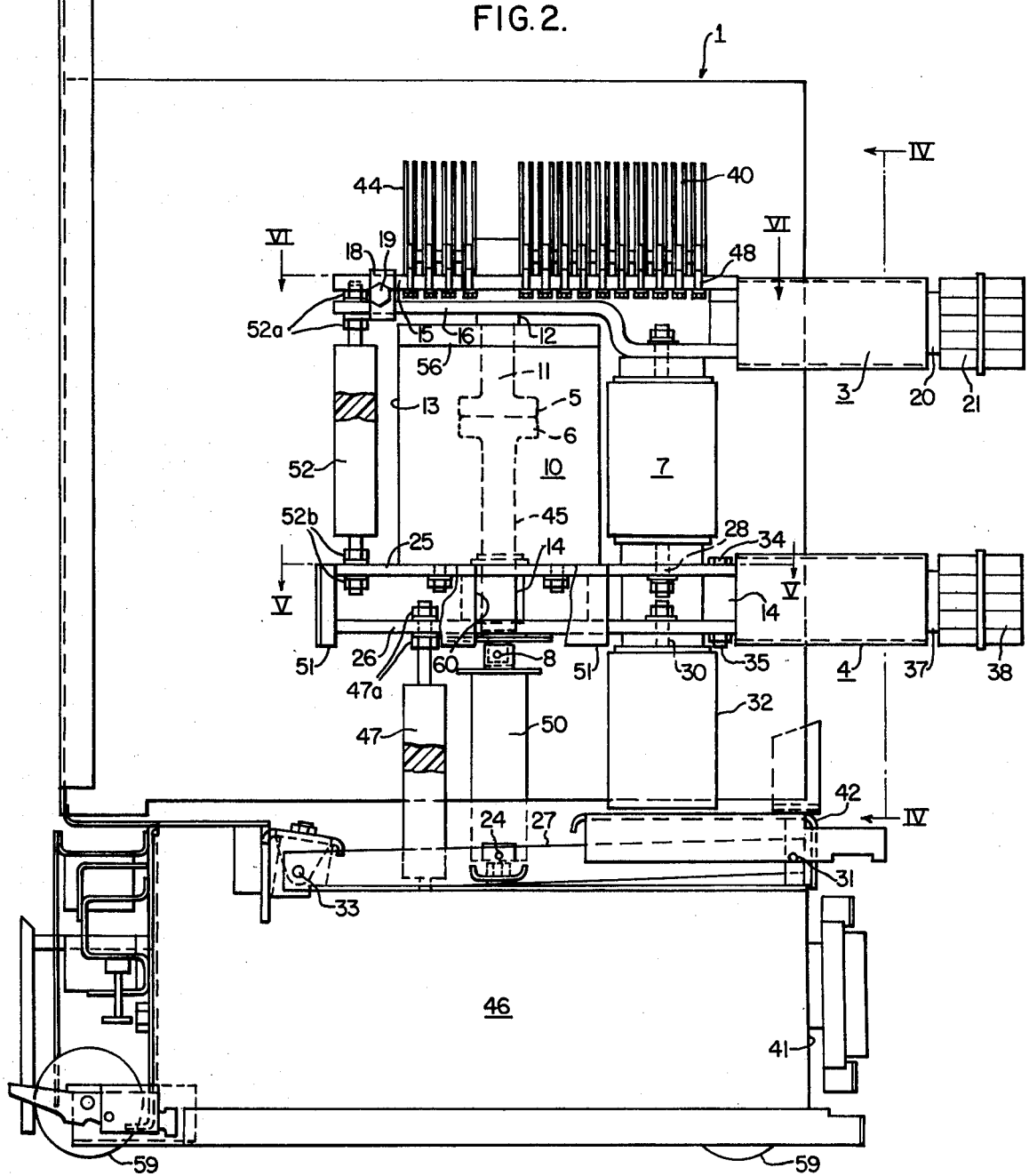
FIG. 2 is a side-elevational view of the three-phase circuit-interrupter of FIG. 1, again the contact structure being illustrated in the closed-circuit position.

Referring to the drawings, and more particularly to FIGS. 1 and 2 thereof, the reference numeral 1 generally designates a roll-in-type switchgear unit. As well known by those skilled in the art, such roll-in-type switchgear 1 is associated with cell structure, not shown, but reference may be had to FIGS. 35 and 37 of U.S. Pat. No. 3,590,188, and a description thereof is incorporated herein by reference.

In more detail, it will be observed that there is provided an upper conductor assembly, designated by the reference numeral 3, and a lower conductor assembly, generally designated by the reference numeral 4, having adjustable features, more fully described hereinafter.

Figure 4:
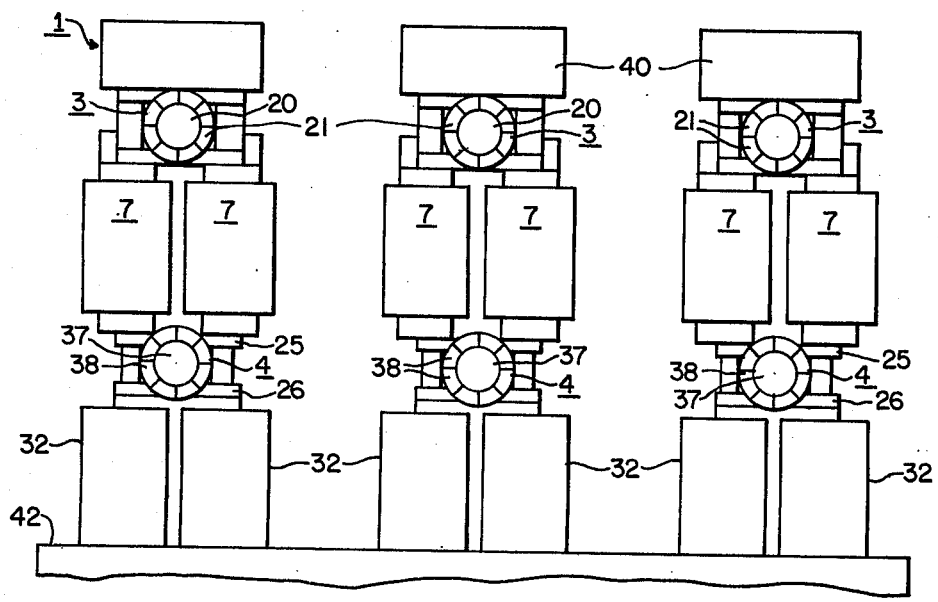
FIG. 4 is a rear fragmentary elevational view, taken along the line IV—IV of FIG. 2, looking in the direction of the arrows.

As more clearly illustrated in FIGS. 1 and 4 of the drawings, a pair of laterally-disposed side-by-side stand-off insulators 7 are provided to fixedly maintain the upper and lower conductor assemblies 3, 4 in the proper spaced-apart relationship. A circuit-interrupting unit of the vacuum type may be utilized, if desired, such as designated by the reference numeral 10, and illustrated more clearly in U.S. patent application, filed July 24, 1972, Ser. No. 274,699 by Sidney J. Cherry, and assigned to the assignee of the instant application.

Generally, it will be noted, that there is provided an upper stationary contact 11 having an upper stem portion 12, which extends upwardly externally of the vacuum envelope 13, and is clamped by a pair of slotted conducting plate portions 15 and 16 by means of a pair of cooperating channel members, or U-shaped clamp elements 18, bolted together by a clamping bolt 19.

It will be apparent, therefore, that the upper stationary contact stud 12 is firmly mechanically clamped, as well as providing good current conducting relationship between the stationary contact 11 and the conducting plates 15, 16 constituting, together with a round solid conductor stud 20, the upper conductor assembly 3. As shown in FIG. 2, the rear end of the conductor assembly 3 has stationary disconnecting contact fingers 21 associated therewith, so as to mate with stationary primary disconnecting contact fingers (not shown) secured within a cooperating cell structure as well known by those skilled in the art.

With reference to FIGS. 1 and 4, it will be observed that there is additionally provided a pair of spaced lower conductor plates 25, 26, the upper one of which is bolted to the stud bolts 28, cast, or otherwise affixed, to the lower ends of the insulating stand-off insulators 7. In a similar manner, the lower conductor plate 26 is affixed, as by being bolted, to the stud elements 30, cast, or otherwise fixedly secured, within the upper ends of the lower stand-off insulators 32. The rear ends of the two conductor plates 25, 26 are bolted, by a mounting bolt 34 and nut 35, to a connecter boss-portion 36 machined, or otherwise formed, in a lower round conductor stud 37, which extends rearwardly to form a movable lower primary disconnecting contact structure 38, which likewise mates with a stationary lower primary disconnecting contact structure (not shown) secured within a cell structure.

FIGS. 1 and 4 more clearly illustrate that the pairs of laterally-disposed stand-off insulators 7, 32, both at the top and at the bottom, are disposeed in generally side-by-side relationship. This enables the withstanding of large phase-to-phase forces, which accompany the passage of high momentary currents passing through the three-phase circuit-interrupter 1.

From the foregoing description, it will be apparent that the present invention illustrates a unique arrangement of conductor and support assemblies 3, 4, associated with pairs of laterally-disposed stand-off insulators 7, 32, and a cooperating vacuum-type circuit-interrupting element 10, that provides a high degree of self-cooling. A plurality of fins 40 may be bolted, or otherwise fixedly secured to the upper conductor support plate 15 to assist in the cooling action, so as to enable the circuit-interrupter 1 to be capable of passing heavy amperage currents without requiring a large cross-sectional area of the conductor support plates 15, 16, 25 and 26. Consequently, the circuit-interrupter 1 of the present invention is able to operate at higher continuous currents without modification to the cell structure. By virtue of the relative positions of the insulators 7, 32, conductors 3, 4, and the interrupter 10, the disclosed arrangement has rigidity comparable to the solid insulation pole-units, such as set forth in U.S. patent application filed Oct. 18, 1972, Ser. No. 298,689, by Charles M. Cleaveland, and assigned to the assignee of the instant application without any increase in size. The rigidity afforded by this unique arrangement allows the circuit-interrupter 1 to withstand the large phase-to-phase forces, which accompany high momentary currents.

The circuit breaker described in this application is built on a standard 15 KV chassis 41 and uses a standard 15 KV operating mechanism. The insulator frame support plate 42 is bolted to the chassis 41 and acts as a cross-member of the chassis 41. This insulator support plate 42 is the foundation or lower support for the three pole-units "A", "B" and "C" of the three-phase breaker 1. There are six, two per phase, lower stand-off insulators 32 bolted, or otherwise rigidly fastened, to the insulator support plate 42. These insulators 32 can be of any suitable insulating material. However, we have used stand-off insulators made of porcelain throughout some experimentation with desirable results. Mounted on top of the lower insulators 32 is the lower conductor plate 26 and interrupter mounting bar assembly 25. This assembly serves as both an electrical conductor, which carries current from the movable stem 45 of the vacuum interrupter 10 to the lower stud 37, and as a mechanical support for mounting the vacuum-interrupter unit 10. The lower conductor 26 and interrupter mounting-bar assembly 25, in conjunction with the lower stand-off insulators 32 and lower support rod 47, provides the necessary rigidity for mounting the vacuum-interrupter unit 10 and operating it through a movable operating rod 50 connected to a lower mechanism 46. Upper stand-off insulators 7 and upper adjustable support rod 52 provide the necessary mechanical support for the upper conductor assembly 15, 16, which is rigidly clamped to the stationary stem 12 of the vacuum-interrupter unit 10 in order to conduct current through the interrupter unit 10. Cooling fins 40 are rigidly fastened to the upper conductor 15, and provide additional surface area for cooling the conductor 15. Provision can be made to fasten additional fins 51 to the lower conductor and interrupter mounting-bar assembly 25, 26, as required.

Lower adjustable support rod 47 is the third point of support for the lower conductor assembly 4. It also provides a means of adjusting the height of the lower contact fingers 38. The ability to adjust the height of the lower contact fingers 38 eliminates the necessity of many critical dimensions which otherwise would be required on the pole-unit "A", "B" or "C" without compromising the ability of the circuit breaker 1 to plug into a standard cubicle cell (not shown).

Figure 5:
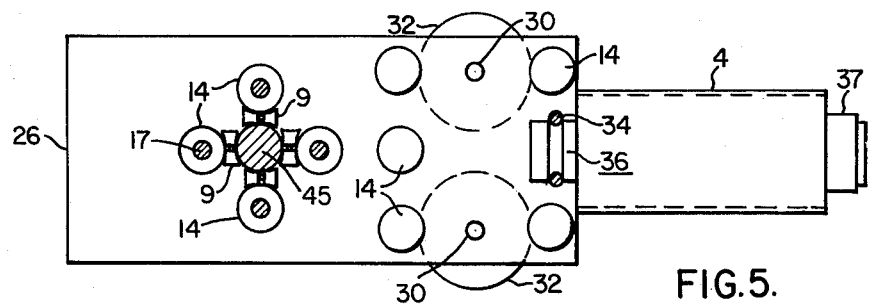
FIG. 5 is a sectional plan view taken along the line V—V of FIG. 2 in the direction of the arrows; and, FIG. 6 is a plan sectional view taken substantially along the line VI—VI of FIG. 2.
Figure 3:
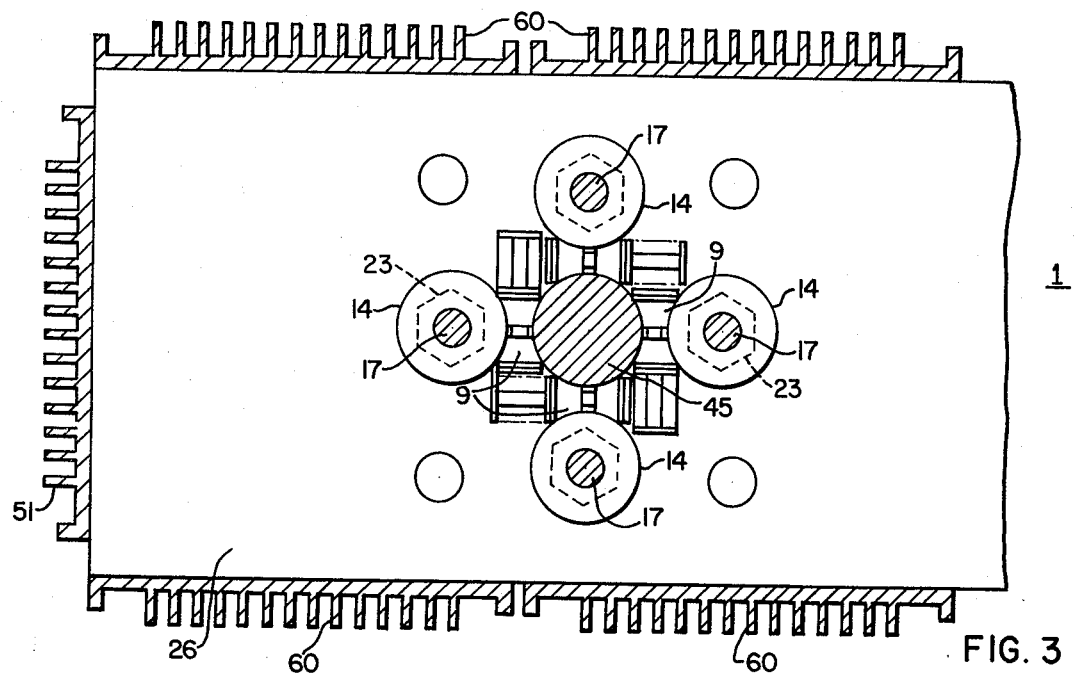
FIG. 3 is an enlarged fragmentary sectional view taken substantially along the line III—III of FIG. 1 looking in the direction of the arrows.
Figure 6:
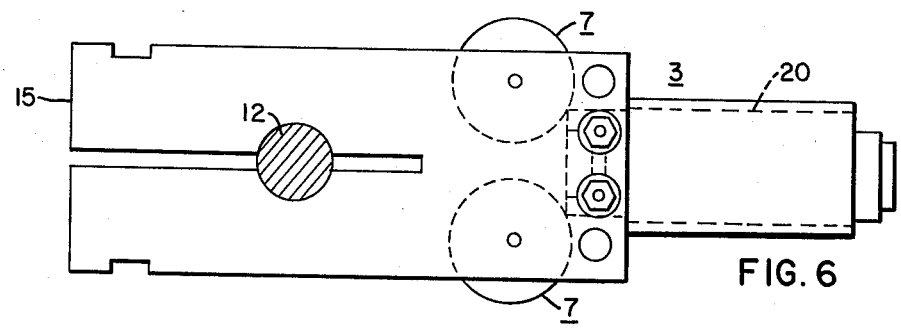

As set forth in the aforesaid patent application Ser. No. 274,699 contacting engagement within the vacuum-type circuit-interrupting element 10 occurs by abutting engagement of the lower movable contact 6 with the upper stationary contact 5, as indicated by the dotted lines in FIG. 2 of the drawings. The reciprocal opening and closing movements of the lower movable contact 6 occurs by corresponding reciprocal opening and closing movements of the lower insulating operating rod 50. As shown in FIG. 2, the upper end of the insulating operating rod 50 is connected, by a pin connection 8, to the lower end of the movable contact stem 45, which engages a plurality of contact-transfer rollers 9, more clearly illustrated in FIG. 3 of the drawings. As illustrated in FIG. 3, the movable contact rod, or stem 45 transmits current by way of the rollers 9 to the four conducting spacing sleeves 14, which additionally serve as a suitable spacing means for the lower conductor bars 25, 26. In more detail, a plurality of mounting bolts 17 pass centrally through the conducting spacing sleeves 14, and thread into the upper mounting bar 25. The lower ends of these studs 17 are secured by nuts 23 to the lower bar 26, as shown in FIG. 5. The conducting spacing sleeves 14 are thus fixedly held and space the two bars 25, 26 apart. Thus, current is effectively transferred from the movable contact 6 and its lower contact stem 45, through the rollers 9 and, through the conducting spacing sleeves to the conductor bars 25, 26, and then through the round solid conductor stud 37 to the lower primary disconnecting contact fingers 38.

The lower end of the operating rod 50 is pivotally connected, as at 24, to a lower operating lever 27, which is stationarily pivoted at 31, and has its left-hand end pivotally connected, as at 33, to a suitable operating mechanism 46, constituting no part of the present invention. Reference may be had to U.S. Pat. No. 3,183,332 issued May 22, 1965 to Frink et. al. for a description of a suitable operating mechanism 46, which may be employed to operate the three pole-units of the improved interrupting assembly 1 of the present invention. The operation of such operating mechanism, not shown, effects slight rotation of the main operating lever 27, and consequently slight vertical reciprocal movement of the lower operating rod 50.

It will furthermore be noted that at the left-hand ends of the two lower conductor bars 25, 26 are bolted the cooling fins, designated by the reference numeral 51, and more clearly illustrated in FIG. 3 of the drawings. These fins, together with the two pairs of side cooling fins 60, assist in a desirable cooling action of the lower conductor-bar assembly 4 of the device.

The upper cooling fin assemblies 40 and 44 are more particularly set forth in FIG. 2 of the drawings. They are secured, as by a plurality of mounting bolts 48, to the upper conductor bar 15 of the circuit-interrupting assembly 1.

The chassis 41, or truck assembly is mounted upon rollers 59, which permit the entire three-phase interrupting assemblage 1 to be rolled laterally into a cooperating cell structure, as in the manner set forth in FIGS. 35 and 37 of U.S. Pat. No. 3,590,188.

The upper support rod 52 provides a means of adjustment for the height of the upper primary disconnecting finger contacts 21. Moreover, the upper support rod 52 in conjunction with the upper pair of stand-off insulators 7 provides a positive clamp for the vacuum-interrupter unit 10. As a result of this clamp, the vacuum-interrupter unit 10 is not required to act as a structural member of the pole-unit. Therefore, the top end plate 56 of the vacuum-interrupter unit 10 is restrained from flexing, and results in less stress on the welded seams of the vacuum-interrupter unit 10, and improves the life expectancy of the interrupter. Moreover, this arrangement is helpful in eliminating contact bounce during the closing operation of the circuit breaker.

By way of further explanation regarding the adjusting procedures, it will be noted that the vacuum-interrupter element 10 is, in effect fixedly secured and rigidly clamped to the upper conductor-bar 25 of the lower conductor-bar assemblage 4, whereas there is merely provided a clamp engagement between the upper stationary contact-stem 12 and the slotted conductor-bar plates 15, 16. Thus, in order to effect an adjustment of the upper movable primary disconnecting contact structure 21 relative to the lower movable primary disconnecting contact structure 38, first the bolt 19 of the connector-clamp 18 is loosened, thereby permitting relative movement between the upper stationary contact-stem 12 and the holes provided in both spaced slotted rectangular conductor-bars 15, 16. Then the nuts 52a, 52b of the adjusting rod 52 are adjusted for the proper vertical relationship, this causing a consequent fulcruming of the upper conductor-bar assemblage 3 about the upper ends of the two adjacently-disposed post-type insulators 7 (FIG. 4). Following a proper adjustment between the two movable primary disconnecting contact structues 21, 38, the nuts 52a, 52b are tightened, and this adjustment is maintained. Then, of course, the horizontally-disposed clamping-bolt 19 is tightened to thereby fixedly secure the clamping electrical engagement between the stationary contact-stem 12 and the two slotted conductor-bars 15, 16.

In a somewhat similar manner, the height of the lower movable primary disconnecting contact structure 38 relative to the chassis 46 is secured by adjusting the nuts 47a of the lower adjusting rod 47. It will be noted in this connection that because of the sliding engagement between the lower movable contact-stem 45 and the rolles 9 that there is a free movement of the vacuum-interrupter element 10 relative to the operating rod 50 and movable contact-rod 45. Again, upon adjustment of the nuts 47a, a consequent fulcruming action occurs between the lower conductor-bar assemblage 4 and the upper ends of the two lower side-by-side post-insulators 32 (FIG. 1). Accordingly, both movable primary disconnecting contact structures 21, 38 are adjustable in height relative to the cell floor, or chassis frame 46, thereby enabling proper alignment between the two movable primary disconnecting contact structures 21, 38 and the two stationary primary disconnecting contact structures (not shown) associated with the cooperating cell, or cubicle-structure, not shown.

This concept leads to a substantial cost reduction in the manufacture of vacuum-type circuit breakers as opposed to the present solid porcelain pole-unit design, as set forth in the aforesaid patent application Ser. No. 298,689.

From the foregoing description, it will be apparent that there has been provided an improved circuit-interrupting structure 1 having desirable adjustment features for accurately adjusting the location of the rear movable primary disconnecting contact structures 21, 38 relevant to the cooperating cell housing.

The clamping construction, disclosed at the upper end of the stationary contact stem 12 is set forth and described in U.S. Pat. No. 3,749,861, issued July 31, 1973 to Norman Davies, and assigned to the assignee of the instant application.

Although there has been illustrated and described a specific structure, it is to be clearly understood that the same was merely for the purpose of illustration, and that changes and modifications may readily be made therein by those skilled in the art, without departing from the spirit and scope of the invention.

I claim:

1. A truck-mounted roll-in-type circuit-interrupter assemblage comprising, in combination, upper and lower power conductor-bar assemblies extending in generally horizontal spaced vertical relationship and movable in a rearward direction into a circuit-operative position within a cooperating cell-structure, insulating supporting means for spacing said two horizontally-disposed power conductor-bar assemblies in spaced vertical relationship, each of said power conductor-bar assemblies having extending rearwardly thereof and disposed at the rear extremities thereof a movable primary disconnecting contact structure (21, 38), insulating and bridging adjusting means (52) for adjusting the vertical height of the upper movable primary disconnecting contact structure at the rear end of the upper power conductor-bar assembly (21), said insulating and bridging adjusting means (52) being disposed adjacent and bridging the front ends of the two horizontally-disposed power conductor-bar assemblies and adjustably fixedly secured in bridging relationship to both of the vertically-spaced conductor-bar assemblies, said insulating supporting means being disposed intermediate the forward-disposed adjusting means and the rearwardly-disposed movable primary disconnecting contact structures so that the upper power conductor-bar assembly may pivot on the upper end of the insulating supporting means as a fulcrum point for adjustment purposes, and circuit-interrupting switching means disposed between said adjusting means (52) and said insulating supporting means.

2. The combination according to claim 1, wherein the circuit-interrupting switching means comprises a vacuum-type circuit-interrupting element having a conducting stationary contact stem (12), and the conducting stationary contact stem (12) of the vacuum-type interrupting element being adjustably clamped to the upper power conductor-bar assembly.

3. The combination according to claim 2, wherein the vacuum-type circuit-interrupting element is fixedly secured in clamped relationship to the lower-disposed power conductor-bar assemblage.

4. The combination according to claim 1, wherein the insulating supporting means comprises a pair of side-by-side insulating stand-off insulators.

5. The combination according to claim 1, wherein means define a lower-disposed mechanism-chassis assemblage, and an additional insulating supporting means spaces said lower power conductor-bar assemblage vertically upwardly away from said lower-disposed mechanism-chassis assemblage (41).

6. The combination according to claim 1, wherein the lower-disposed power conductor-bar assemblage comprises two generally horizontally-disposed rectangularly-shaped power conductor-bars (25, 26), and conducting roller members interconnect the current from the conducting movable contact-stem (45) to the lower power conductor-bar assemblage (4).

7. The combination according to claim 4, wherein means defines a lower-disposed grounded mechanism-chassis (41), and an additional pair of side-by-side insulating stand-off insulators are provided to space the lower power conductor-bar assemblage (4) upwardly away from said lower-disposed grounded mechanism-chassis (41).

8. The combination according to claim 5, wherein a second insulating adjustable supporting-rod means (47) is adjustably secured to both the said mechanism-chassis and the lower power conductor-bar assemblage (4).

9. The combination according to claim 1, wherein the upper power conductor-bar assemblage comprises a pair of vertically-spaced generally rectangularly-configured horizontally-disposed power conductor-bar plates (15, 16).

10. The combination according to claim 1, wherein the upper and lower power conductor-bar assemblages both comprise pairs of vertically-spaced generally rectangularly-configured horizontally-disposed power conductor-bars spaced vertically apart for ventilation purposes.

11. The combination according to claim 6, wherein a plurality of conducting spacing sleeves are provided between the vertically-spaced horizontal power conductor-bars of the lower power conductor-bar assemblage (25, 26), and conducting roller members are interposed between the plurality of spacing sleeves and the reciprocally vertically-movable conducting contact-stem of the vacuum circuit-interrupting element.

12. The combination according to claim 1, wherein one or more metallic cooling-fin structures are affixed to at least a portion of the upper power conductor-bar assemblage.

13. The combination according to claim 1, wherein one or more metallic cooling-fin structures are affixed to at least portions of both of the verticlly-spaced power conductor-bar assemblages (3, 4).

14. A truck-mounted roll-in-type circuit-interrupter assemblage comprising, in combination, upper and lower power conductor-bar assemblies (3, 4) extending in generally horizontal spaced vertical relationship and movable in a rearward direction into a circuitoperative position within a cooperating cell-structure, insulating supporting means (7) for spacing said two horizontally-disposed power conductor-bar assemblies (3, 4) in spaced vertical relationship, each of said power conductor-bar assemblies having extending rearwardly thereof and disposed at the rear extremities thereof a movable primary disconnecting contact structure (21, 38), insulating bridging adjusting means (47) for adjusting the vertical height of the lower movable primary disconnecting contact structure (38) at the rear end of the lower power conductor-bar assembly (4), said insulating adjusting bridging means (47) being disposed adjacent the front end of the lower power conductor-bar assemblage (4) and to a lower metallic framechassis (41), additional insulating supporting means (32) being disposed intermediate the forward-disposed adjusting means (47) and the rearwardly-disposed movable primary disconnecting contact structure (38) so that the lower power conductor-bar assembly (4) may pivot on said generally upstanding insulating supporting means (32) as a fulcrum point for adjustment purposes to accurately locate the rear end of the lower power conductor-bar assemblage (38), and circuit-interrupting switching means disposed between said two vertically-spaced horizontally-disposed power conductor-bar assemblies (3, 4) and located in front of said first-mentioned insulating supporting means (7) so that the first-mentioned insulating supporting means (7) is disposed between said circuit-interrupting switching means and the rearwardly-disposed movable primary disconnecting contact structures (21, 38).

15. The combination according to claim 14, wherein the additional upstanding insulating support means (32) comprises a pair of laterally-spaced post-type insulators.

16. The combination according to claim 14, wherein said circuit-interrupting switching means comprises a vacuum-type circuit-interrupting element said vacuum-type circuit-interrupter element having a movable contact therein, vertically-extending insulating contact-operating means for said vacuum-type circuit-interrupter element, said contact-operating means being disposed between the aforesaid insulating bridging adjustment means (47) and the additional upstanding insulating supporting means (32).

* * * * *